United States Patent Office 3,437,734
Patented Apr. 8, 1969

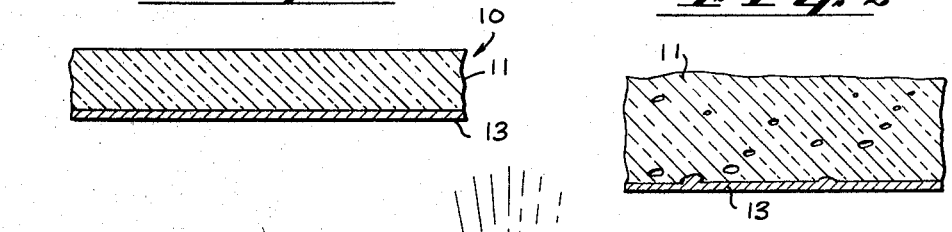
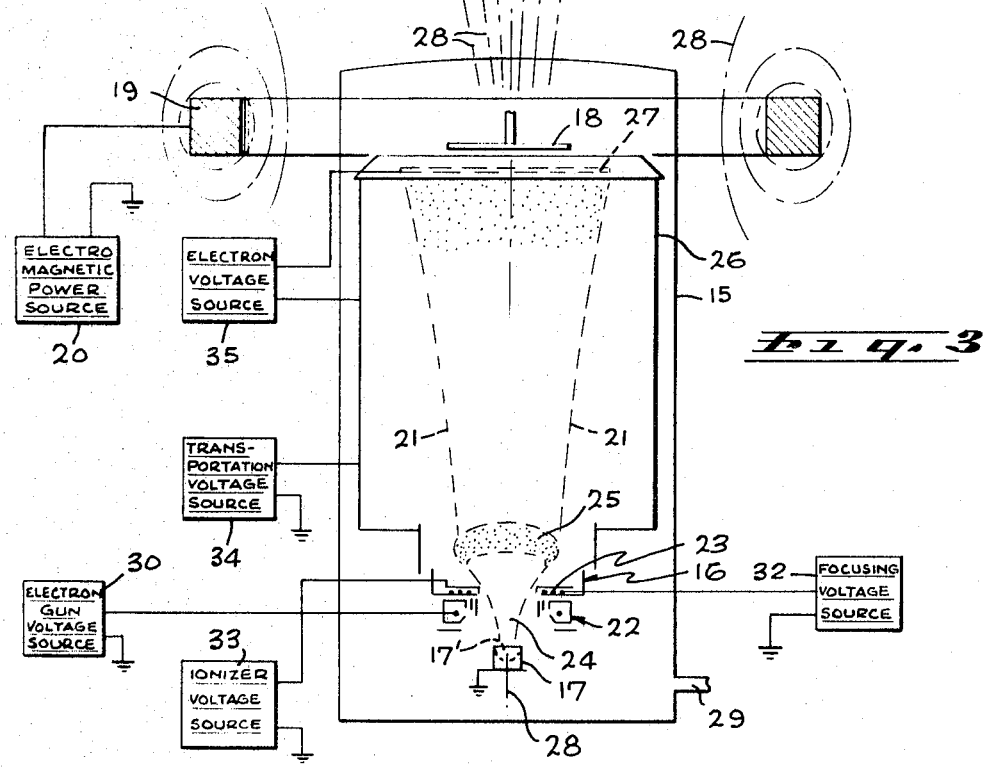
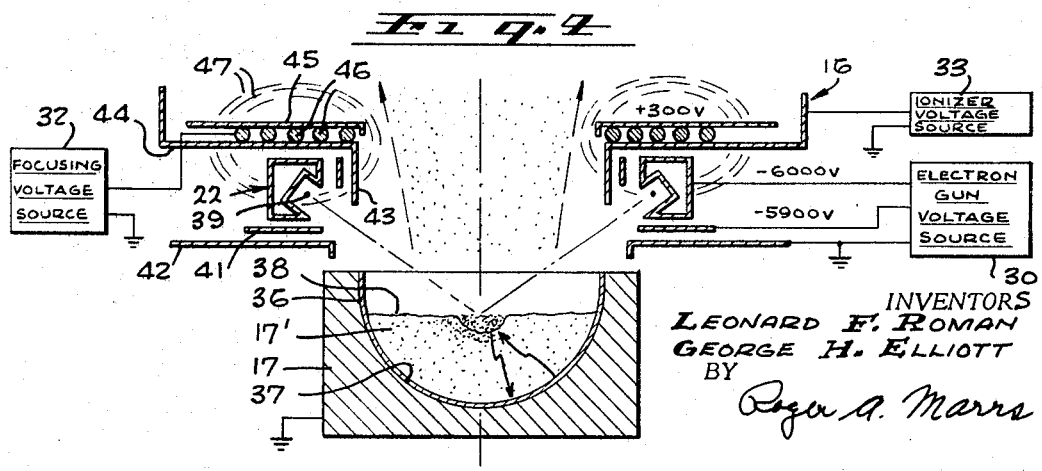
INVENTORS
LEONARD F. ROMAN
GEORGE H. ELLIOTT
BY
Roger A. Marrs INVENTORS
LEONARD F. ROMAN
GEORGE H. ELLIOTT
BY
Roger A. Manns

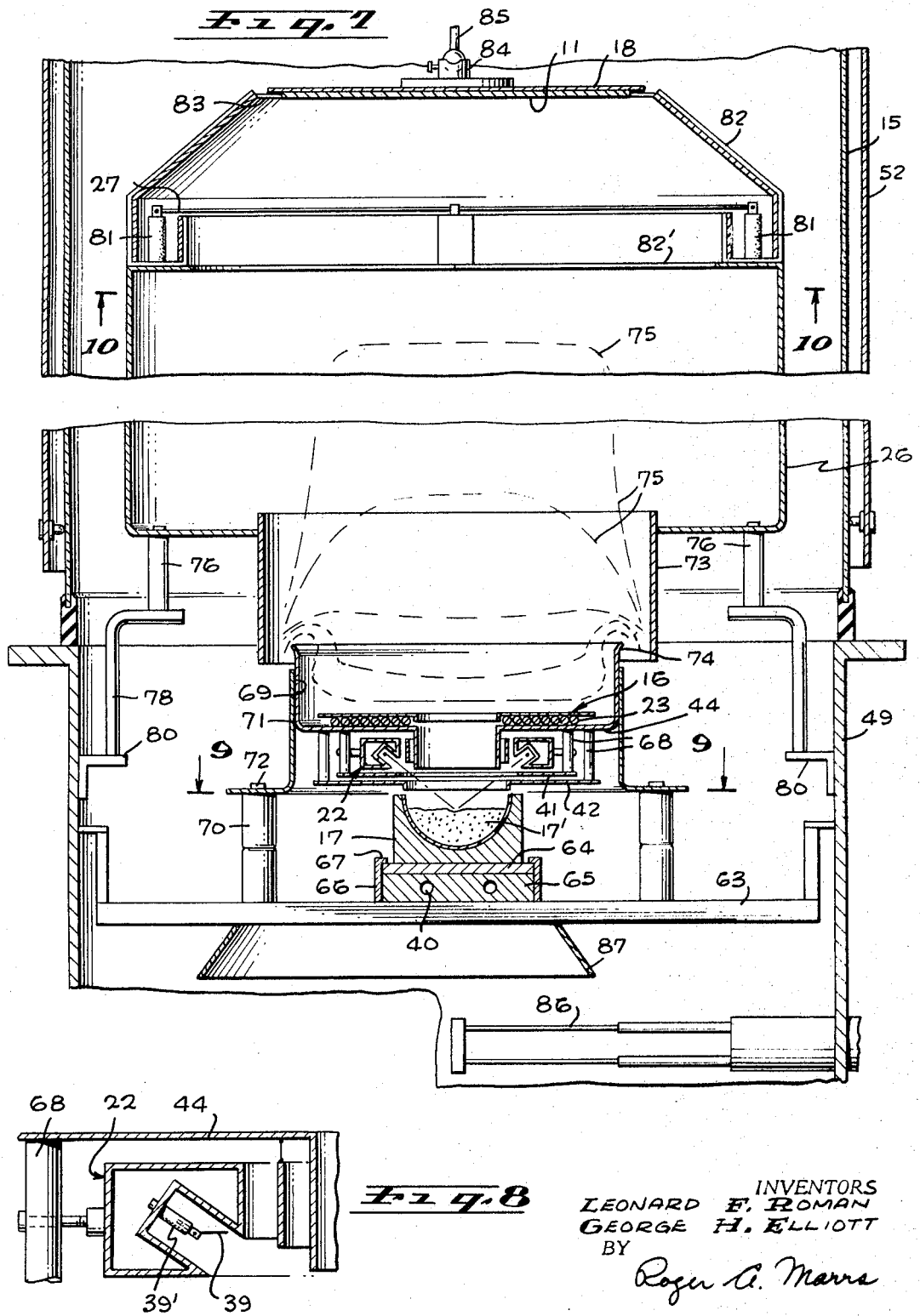

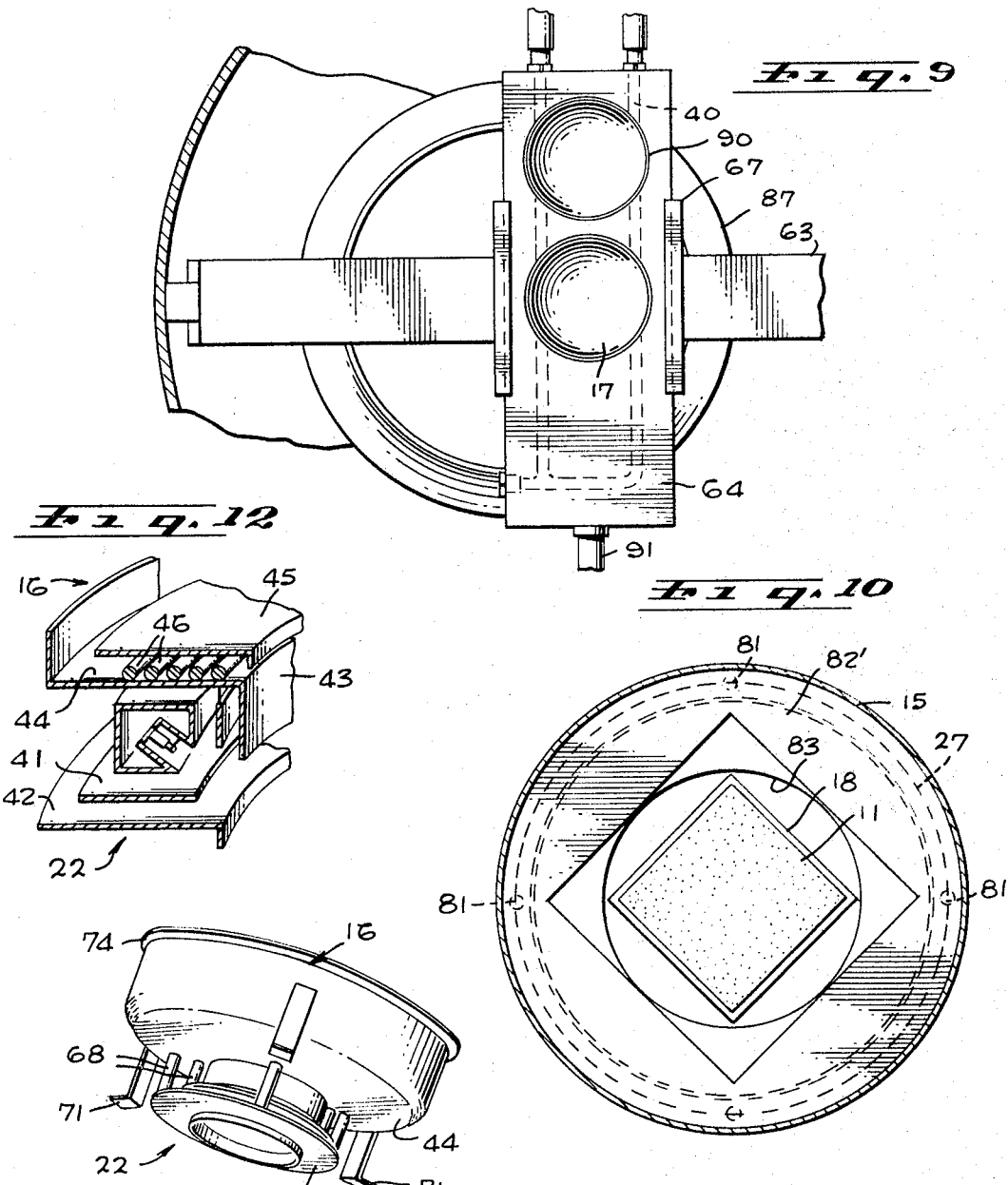

3,437,734
APPARATUS AND METHOD FOR EFFECTING THE RESTRUCTURING OF MATERIALS
Leonard F. Roman, North Hollywood, and George H. Elliott, Granada Hills, Calif., assignors to Isofilm International, Chatsworth, Calif., a corporation of California
Filed June 21, 1966, Ser. No. 559,198
Int. Cl. H05b 9/02, 11/00
U.S. Cl. 13—31      44 Claims

ABSTRACT OF THE DISCLOSURE

An apparatus and method is disclosed herein for depositing a restructured coherent atomic layer of source material on the surface of a substrate located within a vacuum chamber including means for producing a vapor cloud from the source material and means for ionizing the atoms contained in the vapor cloud. Means are provided for establishing an electrostatic potential gradient between the ionizer means and the substrate to accelerate and control the direction of travel of the ionized atoms and further provided are electromagnetic means for generating a uniform magnetic field in the area of the substrate having magnetic flux lines extending normal to the surface of the substrate for controlling the ionized atom deposit on the surface of or in the structure of the substrate.

---

The present invention relates to apparatus and methods for restructuring materials and more particularly to improved ultra-high vacuum deposition techniques and material handling means for restructuring coherent monoatomic layers of conducting, non-conducting and semiconducting materials. Means are provided for depositing multiple thin layers of "predoped" semiconductive materials suitable for active device application and associated electronic components.

As the usefulness of electronic components, circuits and systems having extremely small or minute orders of magnitude has expanded from strictly component oriented problems to problems of microminiaturization incorporating function oriented approaches in which semiconductor material is restructured to obtain desired functions, and with the widening demand, both militarily and commercially, for system and component microminiaturization capable of dealing with problems of heat dissipation, interconnections and signal interactions, the need for economic production of high density electronic packaging has become of increasing importance. A concomitant of this trend is the need for actual producibility of wider classes of function which, while providing the requisite component density, maintains both system reliability and serviceability. Under the thrust of this expanding use, it has become an economic necessity to provide a minimum number of circuit interconnections for microminiaturized components and systems which both minimizes the possibility of error under operating conditions and reduces overall system complexity.

With increase in component density, the reliability of circuit interconnecting means has become of paramount significance. Particularly, this is true with regard to the design, construction and interconnection of circuit components and assemblages which carry out the basic work function of complex electronics equipment such as data processing systems. Conventionally, the electrical circuit network employed in such systems generally comprise a plurality of logic circuits such as "gates" and "flip-flops" interconnected to form an electronic complex designed to carry out the various arithmetical and logical functions for which the equipment is programmed. These aforementioned components and basic circuits lend themselves to compact arrangement by placing circuits, sub-circuits or functioning stages on a single wafer or substrate. Many efforts have been expended in performing this approach by employing thin-film where there is usually a one-to-one correlation between the components in the thin-film manufacture by reactive deposition, evaporation, sputtering, photolithographic techniques, etching and many combinations of passive components.

A particularly new approach to building solid-state circuits resides in the contiguous deposition of single crystal silicon layers on a single crystal silicon substrate by employing epitaxial vapor-growth methods. Laminar layers formed in this process can be controlled in conductivity type, resstivity and thickness. By combining this technique with oxide masking, diffusion and alloying techniques, these deposited configurations can be made into microcircuits. Although vapor deposited semi-conductor films are old in the prior art, most methods involve a volatile compound of the coating material which is reduced or decomposed on a heated substrate. Obviously, the disassociation must take place at the substrate only and at a temperature below the melting point of film and substrate. Current interests in the electronics industry employing vapor deposition processes are generally divided into two techniques which have been explored for carrying the volatile compound to the substrate. One technique is generally referred to as the "close-open tube process" which utilizes a carrier gas which streams through the system with a constant flow rate. On the other hand, another technique is referred to as a "closed system" in which the vapor transport is caused by convection currents between the cooler portion of the system containing source material, and the hotter section which supports the substrate.

The only known process for producing thin layers of silicon material suitable for active device application on insulating substrates is the vapor decomposition of silicon tetrachloride at high temperature directly on sapphire substrates which involves several chemical steps between the silicon and the aluminum oxide surface. The cost of sapphire and the ability to obtain a true crystalline surface has kept this process from finding wide acceptance.

Other vacuum methods used to deposit silicon which, however, are not suitable for active device application include the sputtering process which is a method of glow discharge bombardment of a source of material in an inert gas atmosphere effective to sputter dislodged material on a target. Many close proximity techniques have been tried for evaporative processes in order to minimize contamination levels; however, very limited results have been obtained.

Ion plating, which is a form of the evaporative process utilizes a directed transport technique and has been used for inactive metals such as iron, aluminum etc. This plating process can deposit, on occasion, extremely coherent films; however, the ionization techniques used for these processes will generally not function in the ultra-high vacuum range and they are thereby rendered useless for silicon deposition. Essentially, the ion plating process includes a source of ions which performs the function of reducing the base source material to a gas or cloud, putting it in such condition that it can be transported, further includes a so-called crystallization or target region with or without associated orientation equipment, and finally includes a transport means for transporting the material from the ionizer to a substrate located within or at the crystallization region.

However, difficulties and problems have been encountered when employing vapor deposition equipment and methods since such conventional equipment cannot provide the clean environment and maintain the purity of the vaporized material to the degree that is required for active semiconductor thin-film work because the ion plating techniques will not function in the ultra-high vacuum range. An additional problem encountered with conventional practice resides in the fact that the target will charge electrically and repel the flow of charged ions from the ion cloud. If the target is merely grounded, as is the conventional practice, current will flow in the fresh film and disrupt the crystallizing field which can disrupt the structure.

Furthermore, another problem encountered when employing conventional equipment resides in the fact that no means are provided for adequately cleaning the substrate while the substrate is under high vacuum and ready to receive the film. Gases which are absorbed by the surface of almost anything in open air must be driven off by high temperature, ion or electron bombardment, and high reverse electric fields if the surface is to be made truly clean. A major problem is the elimination of silicon oil backstream diffusion from the vacuum pump as this is a source of substrate contamination.

Another problem residing with conventional equipment stems from the fact that some source materials, such as silicon for example, are extremely difficult to hold in a molten or liquid condition. Therefore, the conventional equipment lacks the structural ability to hold such a material so that a vapor cloud can be created to perform the process. An ancillary problem resides in the fact that the melting of silicon requires temperatures of about 1420° C. which is difficult to achieve if employing conventional heating or melting devices. Although an electron stream has been employed in the past to bombard the source material, such a stream has been found to be incapable of supplying a sufficient quantity of electrons to rapidly melt and vaporize material such as silicon in large quantities.

Accordingly, these difficulties and problems encountered with conventional equipment are obviated in accordance with the present invention which provides a novel method and apparatus for generating a vapor cloud created from a source material and which subsequently forms a coherent restructured layer of this material upon a substrate. Toward this end, the apparatus includes a vacuum chamber incorporating a substrate target or mount enclosed at one end thereof and a novel holder for the source material at the other end thereof. The holder for the source material is adapted to hold source material of different conductivity characteristics and is movably disposed within the vacuum chamber to subject selected source material to a novel heating means for creating intense local heat on the surface of the selected source material. The heating means generates an electron stream of conical envelope whereby the number of electrons generated is greater than can be otherwise produced and which does not interfere with the vapor cloud formation. The conical electron stream is focused on the surface of the source material to be vaporized so that intense heat is created to form a molten pool and its resultant vapor cloud. The vapor cloud is operated on by an ionizer that electrically creates an ion cloud from the vaporized source material. The ionizer shapes the ion cloud and delivers the ion cloud to a transportation region within the vacuum chamber for effecting the transportation of ions from the ion cloud to the substrate. To neutralize the substrate and the supporting member therefor from becoming excessively positive, an electron source means is provided for supplying the target and support members with electrons to counteract the effect of the positively charged ion cloud. A feature of this invention resides in the incorporation of a toroidal electromagnet in the apparatus which provides a uniform magnetic field through and about the central axis of the vacuum chamber. This field confines and shapes the ion plasma in the gun ionizer portion of the unit, thereby assisting in maintaining the cloud pressure in the ionization range. The field is also kept uniform in the target region which assists the non-reacting crystalline substrates in a fashion which aids in the creation of uniform, coherent structures substantially parallel to the substrate surface.

Therefore, it is among the primary objects of the present invention to provide a novel method and apparatus for obtaining non-anomalous, non-amorphous, homogeneous, coherent structure of materials, including semiconductor material of all types of conductivities.

It is another object of the present invention to provide a novel method and apparatus for making semiconductor products incorporating controlled thicknesses and dimensions of each semiconductor layer or region in accordance with predicted characteristics and to make semiconductor type P–N barrier regions of the minimum thickness obtainable consistent with crystal structures.

Another object of the present invention is to provide a novel method and apparatus for obtaining semiconductor products having long surface recombination paths.

Still a further object of the present invention is to provide a novel vapor deposition method and apparatus for controlling the array order of coherent structural growth in a direction normal to the lines of magnetic flux in a uniform magnetic flux field generated by a magnetic means.

Still a further object of the present invention is to provide a novel means incorporated into vapor deposition apparatus for neutralizing the charge upon the substrate target support member which normally is made increasingly positive (or negative) by the bombardment of ions from the ion cloud upon the target.

A further object of the present invention resides in a novel heating means incorporated into a vapor deposition apparatus for creating an intense local heat at a precise focal point on the surface of the source material to be vaporized by employing a conically shaped electron beam.

Yet another object of the present invention is to provide means for focusing the apex of a conically shaped electron stream onto the source material surface so as to achieve maximum concentration of heat at a selected focal point.

Another object of the present invention is to provide a novel means for adjusting the focal point of a conically shaped electron beam having a variable cone length which is influenced by a magnetic field environment in which the electron beam operates.

Yet another object of the present invention is to provide a novel crucible for holding molten source material at elevated temperatures, such as at 1700° C. for example, without effecting diffusion between the source material and the crucible material or contaminating the source material per se.

The features of the present invention which are believed to be novel are set forth with particularity in the appended claims. The present invention both as to its organization and manner of operation, together with further objects and advantages thereof, may best be understood by reference to the following description, taken in connection with the accompanying drawings, in which:

FIGURE 1 is a cross-sectional view of a typical electrical product having an ordered array of coherent restructured region of material applied to a substrate which has been fabricated in accordance with the method and apparatus of the present invention;

FIGURE 2 is a greatly enlarged fragmentary view of a portion of the electrical product shown in FIGURE 1, illustrating the appearance of the restructured material region as having been applied to a minutely irregular substrate surface having surface imperfections;

Figure 5:
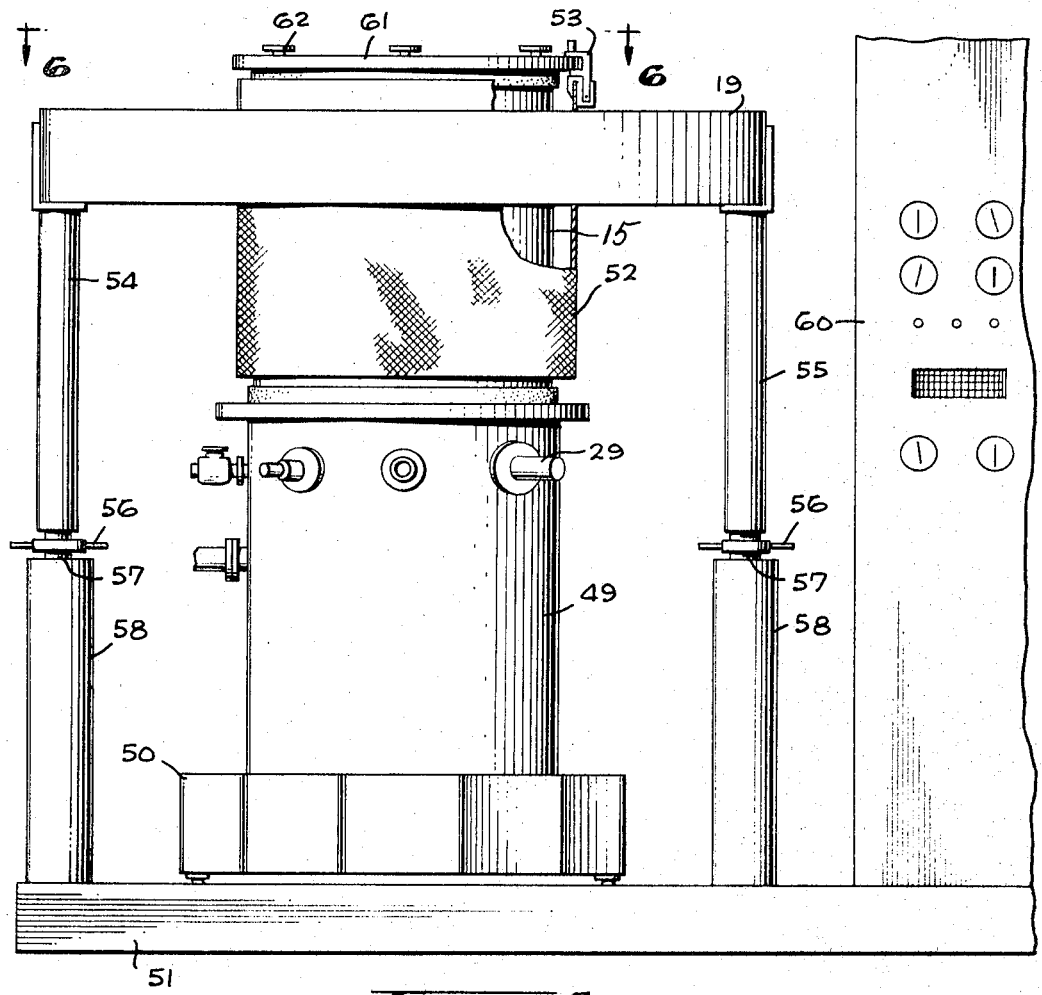
Figure 6:
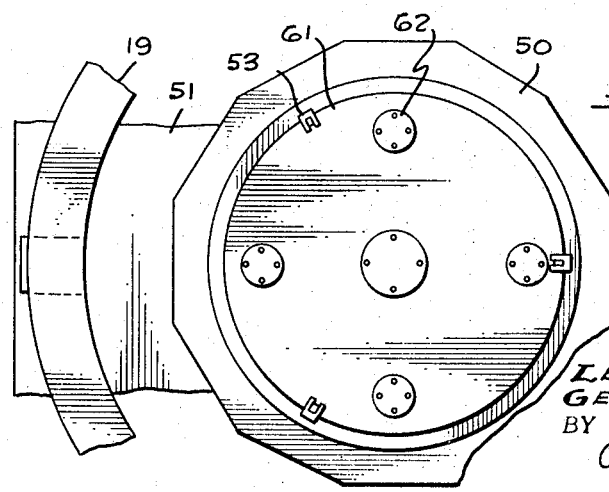

FIGURE 3 is a diagrammatic view of one form of the novel apparatus employed for practicing the novel method of the present invention illustrating means for creating an ion cloud from a source of material, means for transporting ions from the ion cloud within the apparatus and means for controlling the direction of atomic array of restructured material during restructuring of the material upon the substrate surface;

FIGURE 4 is an enlarged diagrammatic view of the ion cloud generating means illustrated in FIGURE 3 for creating the ion cloud including electron bombardment means for creating intense local heat for vaporizing the source material;

FIGURE 5 is a side elevational view of one embodiment of the novel apparatus as diagrammatically illustrated in FIGURE 3;

FIGURE 6 is a partial top plan view of the apparatus as taken in the direction of arrows 6—6 of FIGURE 5;

FIGURE 7 is an enlarged sectional view of the vacuum chamber incorporated into the apparatus shown in FIGURE 5, illustrating the means for generating transmitting the vaporized ion cloud of material;

FIGURE 8 is an enlarged fragmentary view, in section, of the electron source for bombarding the source material as employed in the means for generating the ion cloud shown in FIGURE 7;

FIGURE 9 is a sectional view of the apparatus shown in FIGURE 7 as taken in the direction of arrows 9—9 thereof and illustrating one form of means for holding different types of source material during vaporization;

FIGURE 10 is a cross-sectional view of the apparatus illustrated in FIGURE 7 as taken in the direction of arrows 10—10 thereof and illustrating the target area upon which the substrates are supported during the restructuring of the transported source material thereon;

FIGURE 11 is a perspective view of the electron source means for bombarding the source material as illustrated in FIGURE 7; and FIGURE 12 is an enlarged perspective view, partly in section, of the electron source means as shown in FIGURES 7 and 11.

Referring to FIGURE 1, a typical semiconductor product manufactured in accordance with the present invention is illustrated in the general direction of arrow 10. The semiconductor product may take any desired form suitable for usage in the electronics industry so that the product may be useful in such various applications as transistors, rectifiers, solar sells, diodes, thermo-electric converters and generators, etc. It is to be understood that although the product and process to be specifically described herein are exemplary only and illustrate and specify a layer of only one type of semiconductor material, namely, silicon, additional layers and types of semiconductor material can be employed. Also, reference will be made only to positive ionization and corresponding potential polarities. Therefore, a concomitant feature of the present invention resides in the process and apparatus for obtaining non-anomalous, non-amorphous, homogeneous, orderly array of layers, regions or films of restructured material, including semiconductor material of all types of conductivities, metals and nonmetals, and having either positive or negative valences.

The semiconductor product 10 is illustrated as consisting of a base material 11 such as crystalline quartz, for example, having one surface thereof that presents a highly polished and clean surface on which a thin layer or region is applied of restructured semiconductor material 13 such as silicon, for example. The product illustrated in FIGURE 1 is greatly enlarged wherein the quartz base material may have a typical thickness of 10 mils. The silicon layer 13 represents an orderly array of restructured material having a thickness in the order of $10^3$ angstroms. The quartz structure provides what may be considered and is herein referred to as the substrate, and the silicon material is restructured thereon.

FIGURE 2 is a more greatly enlarged fragmentary view of the interface existing between the silicon layer 13 and quartz 11. The quartz surface presents a few irregular and minute dislocations or imperfections which are extremely difficult to fill or cover employing conventional deposition techniques; however, by employing the process of the present invention, the silicon layer 13 not only covers these minute imperfections and recesses but substantially bridges such irregularities in the exposed surface of the quartz.

Referring now to FIGURE 3, the novel apparatus for restructuring the crystalline structure of a source material onto the surface of the substrate in accordance with the present invention is diagrammatically illustrated. As stated earlier, in general, the basic process of the present invention is practiced within a high vacuum and comprises the three broadly designated steps of generating ions of the source material to be deposited, transporting such ions to the substrate for deposition thereon, and crystallizing or restructuring the source material upon the substrate in accordance with the predetermined dimensions, nature and characteristics of the crystal growth desired. A vacuum chamber 15 is employed which is appropriately sealed and purged of air to a high degree of vacuum. An ionizer 16 is located at the lower end or bottom of the vacuum chamber 15 which is employed for shaping and ionizing the vapor cloud created from the source material. Still within the vacuum chamber and located immediately below the ionizer 16, there is provided a crucible 17 for holding a quantity of source material 17' intended to be restructured onto the composite substrate 11 and 13 carried on a tiltable support member 18 at the top of the vacuum chamber 15. Preferably, the support member and substrate, which may also be referred to as the target, are arranged coaxially with the crucible 17 in fixed spaced relationship thereto. An electromagnetic field source is exteriorally disposed about the top of the vacuum chamber and comprises a toroidal electromagnet ring 19 coaxially disposed with respect to the vacuum chamber and the crucible 17. The electromagnetic field windings and a direct current power source 20 therefor are all located exteriorally of the vacuum chamber as well as the electromagnetic itself. An area defined between diverging broken lines 21 extending between the ionizer 16 and the target 18 may be referred to as an ion transportation area or region for the purposes of this invention.

Disposed between the ionizer 16 and the crucible 17 are means for melting the source material held by the crucible 17 and, in the present instance, such a means includes an electron gun 22 having the capability of generating a conically shaped electron beam so that the apex of the beam converges at the center of the surface of the source material held by the crucible 17. The electron gun further includes focusing means represented by the coils 23 for electromagnetically adjusting the cone shaped electron beam so that maximum electron bombardment will occur at the center of the source material.

A vapor cloud represented by numeral 24 is formed from the melted source material and forms in the lower portion of the vacuum chamber immediately above the crucible. The vapor cloud is subsequently operated upon by the ionizer 16 to provide an ion cloud 25. An electrostatically charged screen 26 surrounding the transportation region 21 is employed for effecting the transportation of the positive ions from the formed and shaped ion cloud 25 through the transportation region 21 to the target 18. Inasmuch as the target will rapidly assume a positive polarity condition as the positive ions are deposited thereon, a feature of the present invention includes an electron source 27 for supplying electrons to the target to effect the polarity neutralization thereof.

The magnet 19 is in the form of a large toroid and the substrate and target 18 are located in the center thereof in an essentially uniform magnetic field as indicated by numerals 28 which identify various lines representing the magnetic field generated by the electromagnet. Preferably, the electromagnet is composed of copper having approximately 1,000 turns of wire wrapped around the exterior thereof and which has been coated with a suitable epoxy compound to seal and protect the windings. The windings of the electromagnet 19 are coupled to the suitable power source 20 so that a direct current magnet results, for example, which will furnish a flux density level of about 50 gausses at the center of the toroid with a resultant approximate 15 or 20 gausses occurring in the area of the ionizer 16.

A conveniently located conduit 29 is disposed through the base of the vacuum chamber for communication with the interior of the vacuum chamber so that connection with a conventional vacuum pump (not shown) may be accommodated for the evacuation of the vacuum chamber 15.

The operation of the apparatus generally illustrated in FIGURE 3 may be described as follows: initially, the vacuum chamber 15 is evacuated to an extremely low pressure which is referred to as a high vacuum, such pressure being in the order of $10^{-10}$ Hg (inches of mercury) or even lower. The main objectives of such a high vacuum are to minimize the collisions of the free ions with any ambient gas particles as the ions traverse the transportation region 21, to minimize the contaminants in the film layer deposit and to prevent any corona discharge due to the presence of any foreign gas particles within the high potential field utilized. Upon attaining the desired vacuum within the chamber 15, voltage is supplied to the electron gun 22 from a suitable source 30 so that electron bombardment of the source material 17' contained within the crucible 17 will cause rapid melting. Voltage supplied from a source 32 is provided to the electron beam focusing electromagnetic coils 23 to adjust the conical electron beam so that the source material is efficiently and rapidly heated to the vaporizing point. As the temperature of the source material is raised by the intense local heat created by the electron bombardment from the electron gun, the source material will melt and form the vapor cloud 24 from the molten pool of source material. Details concerning the novel electron gun and the beam focusing means therefor will be discussed later. Continued heating of the source material and the vapor cloud 24 from the molten pool of source material causes atoms, indicated generally by the dots in FIGURE 3 within the cloud 24, to be liberated. Some of the atoms are ionized due to the electron bombardment. At this time, the majority of atoms do not have any particular charge nor orientation nor preferred direction of travel but simply disperse according to random distribution. Such random distribution is somewhat affected by continuous release of additional atoms from the vapor cloud with the concomitant vapor pressure thereby causing the atoms to congregate somewhat outwardly from the cloud.

The atoms contained within the vapor cloud 24 are caused to be ionized by the ionizer 16, the latter receiving its ionization potential from a suitable ionizer voltage source 33. In other words, according to known theory, the ionizer 16 will pull an electron from each of the atoms within the cloud 24 that is effected by the ionization field of the ionizer. Each of the ions will have a positive charge because of the absence of the electron. Having a positive charge, each of the ions will be repelled by the positive potential of the ionizer and moved toward the center of the ionized cloud. By employing the continuous process of withdrawal of electrons by the ionizer from the cloud 24, a shaped cloud 25 of ions will be created. In the absence of any external forces, the cloud of ions will be constrained in the lower end of the transportation region 21 near the ionizer. Voltage gradient will push some ions back towards the molten pool and these atoms which are pushed back are replenished by new ones so that the cloud is built. The effect of the voltage gradient and the attendant magnetic fields is to pinch the cloud so as to allow only expansion thereof upwardly from the ionizer in the desired direction.

Now, upon energization of a high potential direct current voltage source 34, a negative potential in the order of about 50,000 volts is applied to the charging screen 26 so that an electrostatic field potential gradient will be established across the transportation region 21 extending from the ionizer 16 between the annular charging screen 26 to the target 18 located at the top of the transportation region. The charging screen is made negative relative to the ionizer so that the ions in the ion cloud 25, which have passed beyond the ionizer 16 due to the pressures of the constantly increasing number of ions in the ionic cloud formed within the transportation field, will be rapidly moved across the transportation region 21 toward the charging screen because of the attractive force of the relatively negatively charged screen 26 upon the positively charged ions. The "attractive force" is merely another way of expressing the effect of the electrostatic field potential gradient established by the charging screen and the ionizer across the transportation field 21. More specifically, the electrostatic potential gradient present in the spacing between the ionizer 16 and the lower reduced diameter portion of the charging screen in the vicinity of the ion cloud determines initiation of ion movement and establishes this movement in a desired direction. The upper portion or major part of the screen maintains an equal potential up to the target so that the moving ions will not decelerate. Inasmuch as an ultra high vacuum is the best known insulator, voltage breakdown is not a problem. Also, substantially few of the ions will ever reach the charging screen. Furthermore, the speed of the traveling ions is adjustable and about $10^4$ to $10^6$ meters/sec.

It is to be kept in mind that the magnetic field of the toroidal electromagnet 19 is located along the entire transportation region 21 such that lines of flux 28 extend substantially normal to the target 18 and parallel to the central vertical axis of the vacuum chamber. The ions will not attempt to cross these lines as the ions travel toward the target. A more detailed description of the magnetic field and the apparatus for its genration will be given in connection with FIGURE 7. The magnetic field lines of flux are normal to the surface of the substrate upon which a film or films will be deposited. The combination of the magnetostatic and electrostatic stresses promotes a very even distribution and orientation of the ions as they approach the substrate 18. The electron source 27 precharges the target to some value slightly more negative than the charging screen. For example, a negative potential in the order of 60,000 volts may be employed. This effectively cuts off the electron source. Ions are deposited on the target when the electron source is off. Upon reaching the substrate 18, each of the transpotred ions will gain an electron as supplied by substrate target and, thus, become discharged or neutralized so as to return to its original atomic valence state. Thus, the ions will have returned to their condition as atoms as previously designated by the dotted portion included in the envelope 24 and will have been merely transported from the atomic cloud at the vaporized and molten source material 17' to contact with the surface of the substrate 18, ignoring for the moment the effect of the kinetic energy imparted to the atoms due to their transportion velocity. After initial deposit of ions, the substrate target polarity becomes positive which re-activates the electron source 27 to supply additional elctrons to the target. Otherwise, subsequent deposits could not be readily achieved.

An electron voltage source 35 is employed for supplying additional electrons to the target and the support therefor via an annular filament electron source 27 so as to achieve the neutralizing effect. At the moment of impact with the substrate, the ions and the immediately discharged atoms will still have their heat of vaporization. This heat will be lost by direct radiation. It is to be noted and understood that the magnitude of the transportation potential supplied by source 34 and screen 26 is restricted to a value sufficient to insure that the impinging ions do not bounce or otherwise leave the surface of the substrate upon their own impact or, after being deposited, upon impact or subsequent ions. However, prior to depositing the resultant film or layer, the ions may be employed to clean or otherwise prepare the substrate surface by impingement thereon, if desired.

The neutralized atoms forming the layer on the substrate will immediately begin to form a minimum energy structure on the surface of the substrate. Upon being neutralized, the neutral atoms on the surface of the substrate will no longer be affected by the electrostatic field of the transport potential. Normally, the neutral atoms will have a random orientation and distribution with respect to each other; however, the parallel lines of flux 28 extending normal to the intended direction of crystalline growth established by the electromagnet 19 will alter this random orientation and distribution in a manner in accordance with the present invention. The lines 28 of magnetic flux will constrain the neutral atoms to a planar film distribution on the substrate surface. That is, any random tendency of the neutral atoms to pile upon each other or otherwise seek a level represented by a configuration other than a uniform film thickness will be eliminated. In accordance with their nuclear magnetic moments, each of the neutral atoms will tend to become aligned in a direction related to the unidirectional flux lines of the magnetic field. Each of the neutral atoms achieves a stress relieved orientation with respect to each of the other neutral atoms in the film. Such orientation permits subsequent structured growth in accordance with the well known orderly and preferred deposition of atoms within a crystal.

Referring now to FIGURE 4, a more detailed description of the source material holder 17, electron heating source 22 and ionizer 26 will be presented. Extreme purity of the melt is a basic requirement in the melting of the source material, especially silicon, for the production of semiconductor crystals. The use of crucibles introduces the danger of contamination entering into the melt from the material of the crucible. One method for circumventing this danger is disclosed in U.S. Patent 3,051,555 by providing a crucible made of copper material having a melting point lying under that of the melt. The crucible body is lined on the inside thereof with a layer or coating of purest silicon. A cooling agent is circulated through the crucible body to cool same. However, completely satisfactory results are not achieved employing this method because of the extremely high temperature required to vaporize silicon as a source material at any appreciable rate. For example, a temperature of approximately 1,700° C. is required to vaporize silicon for any practical applications employing methods for crystalline growth. Under such a condition, it has been found that the body material of the crucible, particularly copper, will diffuse with the edge of the silicon liner. A temperature range of approximately 800° C. to 1,000° C. is present at the areas of contact between the silicon and copper which represents the diffusion range for silicon so that slowly, copper will diffuse from the crucible heat sink into the silicon source material being vaporized. Also, under such high temperautre conditions, the silicon liner whether it be pure silicon or a silicon oxide has a tendency to discolor which adversely affects the concentration of heat at the center of the source material when the source material is held in a crucible. Because silicon is transparent to heat, the heat created at the point of vaporization is transmitted to the surface of the crucible holding the source material where the heat should be reflected back to the melt which complements the creation of heat at the vaporization point. However, the discolored surface or liner separating the crucible from the source material will not efficiently reflect the transmitted heat and therefore a heat loss is encountered at the vaporization point where it is most desirable to create maximum heat. An optically correct shape of the crucible is required to efficiently obtain maximum temperature.

These problems are overcome by the novel crucible of the present invention wherein an embodiment of a crucible for melting silicon is shown represented by numeral 17 which indicates a copper crucible body provided with a plated polished chrome liner 36 disposed within a hemispherical recess 37. The silicon source material 17' is seated within the hemispherical chrome liner 36 and preferably has a relatively flat continuous surface 38 having its center on the major vertical axis of the vacuum chamber. The crucible 17 is maintained at a relatively cool temperature preferably under 500° C. by recirculating a suitable coolant such as liquid nitrogen or cold water through ports and passageways 40, as illustrated in FIGURE 9, within the base 65 which supports the crucible 17. Because of the reflected surface offered by the chrome liner, the silicon source material has a thermal gradient extending from the liner to the molten region at the center of surface 38. Inasmuch as the crucible is hemispehrical, the thermal gradient in all directions will act as the line of focusing toward the center of the sphere in the melting region. Preferably, the hemispherical diameter as illustrated represents 2¾ inches. By directing a high intensity electron beam from the heating source 22 at the center of the source material surface, intense local heat at the desired temperature is created to melt the source material for vaporization. The advantage of using the hemispherical heat sink with a correspondingly configured liner resides in the fact that an optical heater is constructed in addition to the electron heater whereby the energy which is radiated toward the polished surface of the chrome layer 36 is reflected back to the local heat point at the surface center of the source material to aid in creating the intense local heat to effect vaporization of the source material.

The heating means is illustrated diagrammatically in FIGURE 4 and in greater detail in the views illustrated in FIGURES 8, 11 and 12. Although electron sources such as electron guns have been employed in the past for supplying a stream of electrons to a source material in an effort to create an intense local heat, such prior art means have encountered several problems. One such conventional device is disclosed in U.S. Patent 2,754,259. To create sufficient enough heat to vaporize high meltable temperature materials such as silicon at a high rate, for example, a single electron beam is incapable of supplying sufficient electrons to the central point on the surface of the source material to create sufficient localized heat to cause not only melting of the material but the vaporization thereof. Also, the electron beam must pass through the vaporized cloud to reach the source material which adversely effects the creation and control of the ion cloud. In some instances, such as is disclosed in U.S. Patent 3,235,647, elaborate means and mechanisms have been provided to distort or bend the electron beam around the vapor cloud created so as to avoid these adverse effects. However, such schemes greatly complicate focus and can decelerate the stream of electrons which further inhibits the creation of intense localized heat. These problems are obviated by the employment of the electron heating means incorporated into the present invention which includes a toroidal electron gun 22 that surrounds the source material 17' and directs a conical shaped electron beam towards the center of the source material. The electron gun is arranged coaxial with the central vertical axis of the vacuum chamber and includes a circular or ring filament 39, preferably composed of thorium tungsten or the like, from which the electrons issue. As seen in FIGURE 8, the filament is mounted on electrically insulative stand-offs 39'. The apex of the conical electron beam is directed towards the center of the source material to create intense local heat at this point. To attain conical form and total electron beam shaping, the electron gun employs a two-stage accelerator which is also in toroidal form and is represented by numerals 41 and 42. Power for the electron gun is derived from a suitable voltage source 30 that may supply approximately 3,500 watts which is sufficient to vaporize the silicon source material, for example, at about 2,000 watts. Therefore, approximately 1,500 watts may be considered as extra which may be employed to more speedily initiate evaporation of the source material. The electron gun is subjected to a negative potential in the order of 6,000 volts and the material is held at ground potential so that a 6,000 volt total acceleration is gained. The first accelerator plate 41 is maintained at a negative potential of 5,900 volts while the second accelerator plate 42 is maintained at ground potential. A downwardly depending portion 43 of a pan 44 forming a part of the ionizer is provided with a positive 300 volts that assists in focusing the electron beam into its conical configuration. Preferably, the angle of the electron beam is in the order of 30° to 37° at the apex. The ionizer 16 further includes a plate 45 which is arranged in fixed spaced relationship with respect to the pan 44.

In the space between the upper plate 45 of the ionizer and the pan 44 thereof, there is disposed a toroidal electromagnetic coil 46 constituting the focusing means 23 which is employed for focusing the apex of the concially configured electron beam at a central point on the surface of the source material. Although the electron beam is directed at the center of the material electrostatically, there is a variable magnetic field present which is part of the field generated by the toroidal electromagnet 19. Field energy of approximately 15 gausses is present in the vicinity of the electron gun and the source material when approximately 50 gausses is present in the target area. This magnetic field has an adverse effect on the conical electron beam which causes the beam to be pulled downwardly so that the apex of the beam would normally occur below the surface of the source material. The electron beam which was originally focused at the center will be deflected at a greater angle downward and spread its effect outwardly over the surface of the source material which is undesirable. Therefore, it is necessary to redirect the electron beam back upwardly so that the apex of the beam strikes at the center of the source material. To produce such a redirection effect, the toroidal electromagnet 46 is employed. The magnetic field generated by this coil, represented by numerals 47, is at right angles to the field being generated by the large toroidal electromagnet 19 in the immediate vicinity of the filament 39 and therefore its direction will cause the electron beam to move upwardly rather than downwardly. By balancing this magnetic field against any particular setting of the variable field producing electromagnet 19, the electron beam can be directed back to the center of the source material. Thus, variable focusing is gained for the conically shaped electron beam by means of the focusing magnet 46. It is to be particularly pointed out that the magnetic field from the focusing coil operates on the electron beam almost immediately upon the emission of the electrons from the filament 39 in an area adjacent thereto prior to any accelerating effect produced by the two-stage accelerator. The magnetic field also causes the vaporized source material to be pinched or confined in the central passageway communicating the source material with the lower portion of the transportation region 21. The pinching effect of the vapor causes the vapor to form into a column which is being transported upwardly. The electromagnetic field produced by coil 46 maintains the ionized material in a confined location so that the ionized material does not contaminate itself by bombarding the surface of the electron gun.

Referring now to FIGURE 5, a side elevational view of the apparatus of the present invention is illustrated wherein the vacuum chamber 15 is mounted on a base 49 supported on a suitable flooring 51. The base 49 is provided with various conduits and plumbing communicating the vacuum chamber exteriorally of the base that are necessary to effect an ultra high vacuum within the chamber 26. Located about the lower periphery of the base 49, there is provided a plurality of magnets 50 which are employed in a conventional vacuum system. Suitably carried about the vacuum chamber 15, there is provided a protective screen or grate 52 which offers protection in the event the glass portion of the vacuum chamber 15 should shatter. Fixtures 53 retain the grill 52 in position about the chamber 15. Disposed about the vacuum chamber and in coaxial relationship therewith, the toroidal electromagnet 19 is supported by stanchions 54 and 55. Vertical adjustment of the electromagnet upwardly and downwardly can be effected by rotation of fixtures 56 which operate on threaded posts 57 that are carried by base stanchions 58, respectively. Located adjacent the apparatus, there is provided a control panel 60 displaying a variety of suitable gauges, dials, buttons, recording equipment and the like. A feature of the vacuum chamber of the present invention resides in the fact that the chamber 15 is not configured in accordance with the usual bell shaped chamber but includes a removable flat lid or cover 61 which is seated about the upper periphery of the chamber 15. In this fashion, the lid 61 may be removed from the supporting annular wall of the chamber so that the various elements and components held within the chamber may be worked upon and so that substrates may be arranged on the target backing. The cover or lid 61 is provided with a plurality of covered passageways 62 therethrough which may be employed to mount and hold a variety of target configurations if desired.

FIGURE 6 more clearly illustrates the cover or lid 61 including the covered passageway 62 by which targets or other structures may be held within the vacuum chamber.

Referring now to FIGURE 7, the base 49 is illustrated as supporting a mounting member 63 that supports the various elements contained within the vacuum chamber 15. Immediately supported on mount 63 is the crucible 17 which is fixed to a movable plate 64 that slides on a crucible base 65. The base and movable plate 64 are held in place by means of side supports 66 which are arranged on opposite sides of the base and plate and include inwardly projecting flanges 67 to hold the movable plate as the plate slides rectilinearly on the base 65. The crucible 17 will be described in greater detail with reference to FIGURE 9.

The two-stage accelerator plates 41 and 42 are downwardly depending from electrically insulative stand-offs 68 which are fastened to the pan 44 of the ionizer 16. The ionizer 16 and hence the electron gun 22 are supported on the mount 63 by means of insulative stand-offs 70 that not only hold the ionizer and electron gun in fixed spaced relationship with respect to the crucible but maintains the ionizer and electron gun in coaxial relationship with the crucible and the central vertical axis of the vacuum chamber 15. The ionizer pan 44 is held stationary by means of brackets 71 which are fastened at one end to the exterior periphery of the pan vertical wall 69 and detachably coupled at the other end to the end of stand-offs 70 by means of fasteners 72. The lower portion of the charging screen 26 which is of reduced diameter and which is represented by numeral 73 is positioned in fixed spaced relationship with respect to the pan vertical wall of the ionizer and the lower peripheral extremity thereof is positioned below a curled lip 74 of the pan wall. Such an arrangement provides an annular passage between the inner surface of the charging screen's lower portion 73 and the curled lip 74 of the pan 44. By this means, and when voltages as previously mentioned are applied to the charging screen and the ionizer, accelerating electrostatic potential gradients exist which follow the general pattern of the broken lines represented by numeral 75. Because of this potential gradient, ions in the cloud 25 will be carried through the transport region 21 in the direction of the target 18.

The lower portion 73 may be attached to the major portion of the charging screen by any suitable means; however, it is to be noted that the charging screen 26 is supported within the vacuum chamber 15 by means of insulative stand-offs 76 which are mounted on brackets 78 supported from the wall of the base 49 by mounts 80. Located on top of the charging screen 26, electron source 27 is supported thereon by stand-offs 81. The stand-offs suitably insulate the filament of the electron source 27 from the charging screen 26. It is to be noted that the electron source 27 is of annular configuration so that the electron may be considered a toroidal electron gun whose electron emission is directed to the target 18 on which is mounted the substrate 11. Also mounted on top of the charging screen and encompassing the electron source 21, is a dome 82 in which is formed an opening 83 into which the target 18 is located. Although a single sheet or layer of stbstrate material 11 is illustrated, it is to be understood that a plurality of substrate chips, sheets, or the like may be suitably fastened and held by the underside of the target 18 as desired.

A feature of the present invention resides in the fact that the target 18 may be oriented within the opening 83 to any desired extent by means of a universal joint fixture 84 that couples the target 18 to a mounting shaft 85. The mounting shaft projects through the central passageway provided in the lid or cover 61 and terminates in a vacuum seal cover 62. By this means, once the orderly growth or array of atoms has been commenced in a desired direction as oriented by the magnetic field of the toroidal magnet 19, the target may be repositioned at a different angle with respect to the direction of travel of the ions whereby continued growth of the coherent array will continue.

To augment the vacuum sytem, a heater element 86 is illustrated disposed below the mount 63. Also, a conical pan 87 is shown mounted on the underside of the mount 63 which may serve as a getter in the removal of contaminants during pumpdown by the vacuum system.

Referring now to FIGURE 9, the crucible 17 is shown as mounted on the sliding plate 64 in such a position that the crucible is coaxial with the central vertical axis of the vacuum chamber. Crucible 17 may be employed to hold one type of semiconductor material such as N type for example, and atoms from this source material may be employed initially to construct an orderly coherent array of restructured material on the substrate surface. However, a feature of the invention resides in the fact that a second deposition of another source material such as P type material may be restructured by employing another crucible 90 which is carried on the movable plate 64. Upon sliding plate 64, crucible 17 will be moved out of its original position and crucible 90 may be moved within the previous location occupied by crucible 17. The plate 64 may be slid on base 65 by a reciprocating rod 91 which is attached to the plate 64 and which may pass through the wall of base 49 so that an operator may change the position of the crucible from outside the vacuum chamber without the necessity of breaking vacuum. The rod 91 may take the form of a lead screw or may be operated from a cam arrangement. Therefore, the heat sink crucible arrangement is made up of two independent crucibles 17 and 90, wherein each crucible can contain a different source material. In one case, for example, crucible 17 could be N type silicon and the other crucible 90 could contain a P type silicon. If desired, the source material in the crucible which is not being acted upon may be covered with a suitable lid composed from some high refractory material such as molybdenum, tantalum, tungsten or the like so that the lid will not melt. Therefore, only one source material at a time may be exposed for heating and vaporization by the electron source 22.

Referring to FIGURE 10, the underside of target 18 is more clearly illustrated which shows the substantial surface area exposed by the apparatus of the present invention upon which vapor deposition may be directed in order to provide a coherent and orderly array of restructured material. It is to be understood that the target mount may be adaptable to mount a plurality of substrates on which the restructured material may be deposited or the target mount may readily hold a single substrate target of substantial surface area. Also, if desired, various shapes and configurations of masks may be employed ahead of the substrate surface on which deposition takes place that may be employed to locate selective areas on the substrate surface which are intended to receive the deposit.

In view of the foregoing, it is seen that the apparatus and method of the present invention generates a vapor cloud created from a source material and which subsequently forms a coherent restructured layer of this material upon a substrate to form an electrical product. Source material of different conductivity characteristics are employed so that multiple layers or films of such material can be restructured on the surface of the substrate. The average time lapse for deposition of such a restructured layer would be in the order of one to two minutes for a given source material. Immediately thereafter, another source material may be vaporized, ionized and transported for deposit on the product in approximately the same length of time. This may be achieved without breaking the vacuum of the vacuum chamber and without necessitating added steps for decontaminating the vaccum chamber.

The structural coherence achieved by the deposited material is a function of the substrate surface character and the intensity of the magnetostatic field present at the surface of the substrate and the thermal energy present or being supplied by arriving ions. When the energy and restructuring forces are optimized for given materials, coherence can be maintained to the degree required for active semiconductor devices. In most cases, the magnetostatic restructuring field requirement is inversely proportional to the crystallinity of the surface being deposited and the structural correspondence of the deposit.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. A method of depositing a coherent atomic layer of source material onto the surface of a substrate, comprising the steps of:
   vaporizing the source material in an ultra high vacuum environment to produce a vapor cloud of atomized source material;
   ionizing the atomized source material to provide a shaped and confined ion cloud;
   transporting the ions incorporated in the ion cloud to the substrate;
   generating a uniform magnetic field in the area of the substrate having magnetic flux lines extending normal to the surface of the substrate for directing the orderly deposit of the ionized atoms in a preferred orientation; and
   neutralizing the deposited ions while under the continued influence of the magnetic field to form a restructured coherent atomic array of the source material.

2. The method as defined in claim 1 including the step of:
   subsequently repeating the previous steps to form a second restructured coherent atomic array on the first array.

3. The method as defined in claim 2 including:
forming the second array of source material with different electrical conductivity characteristics than the characteristics of the source material employed for restructuring of the first array in order to produce multiple layers on the substrate.

4. The method as defined in claim 1 wherein said vaporization step includes:
heating the source material by electron emission following a conical pattern from a toroidal electron source; and
focusing the conical electron emission so as to concentrate electron bombardment at a central point on the surface of the source material to create intense local heat without interfering with the formation of the ion cloud.

5. The method as defined in claim 4 wherein said vaporization step further includes:
holding the source material being heated in a hemispherical walled crucible operating as an optical heater whereby radiated heat from the central point on the surface of the source material is reflected back by the hemispherical wall to the central point to augment material heating by said electron emission heating step.

6. The method as defined in claim 5 wherein said focusing step includes:
generating a toroidal magnetic field surrounding the vapor cloud for effecting the shaping and confining of the formed ion cloud.

7. The method as defined in claim 6 wherein said vaporization step further includes:
cooling the portion of source material disposed between the central point on the surface thereof and the hemispherical wall by maintaining a constant fluid flow through the crucible support effective to reduce the temperature of the crucible body.

8. The method as defined in claim 7 wherein said neutralizing step includes:
supplying a quantity of electrons to the substrate prior to the deposition of the ions thereon so that the substrate assumes a more negative potential than the ion cloud.

9. The method as defined in claim 8 wherein said transportation step includes:
establishing an electrostatic potential gradient effective to initiate and accelerate movement of the ions in a preferred direction towards the substrate and further being effective to maintain ion velocity through the ultra high vacuum environment.

10. The method as defined in claim 1 wherein:
the substrate constitutes a crystalline seed having a uniform polished surface adapted to receive the orderly deposit of ionized atoms.

11. A method for effecting the restructuring of a source material to form a coherent atomic layer of the source material on the surface of a substrate comprising the steps of:
generating a uniform magnetic field having magnetic lines of flux extending substantially perpendicular to the substrate surface;
generating ions of the source material to be deposited; and
forming the coherent atomic layer of source material in a preferred direction at the right angles to the magnetic lines of flux while under the continued influence of the magnetic field.

12. The method as defined in claim 11 wherein said forming step includes:
electrostatically transporting ions in an ultra high vacuum for deposition of the substrate surface; and
neutralizing the deposited ions so as to effect return of the ions to their original atomic valence state.

13. A method of depositing a coherent atomic layer of source material onto the surface of a substrate, comprising the steps of:
simultaneously electronically and optically heating a central localized portion of the source material in an ultra high vacuum environment to produce a vapor cloud of atomized source material;
ionizing the atomized source material with an ionizer to provide an ion cloud;
electrostatically transporting the ions incorporated in the ion cloud to the substrate by establishing an accelerating potential gradient between the ionizer and the substrate so as to initiate movement of the ions in the direction of the substrate;
generating a magnetic field in the area of the substrate having magnetic flux lines extending substantially normal to the surface of the substrate for controlling the direction of the ionized source material in a preferred orderly arrayed orientation;
neutralizing the deposited ions while under the continued influence of the magnetic field so that the ions are returned to their original atomic valence state resulting in a restructured coherent atomic array of the source material; and
supplying additional electrons to the substrate in preparation for subsequent deposition of another restructured coherent atomic array of the source material.

14. The method as defined in claim 13 wherein said resultant first restructured coherent atomic array is composed from source material having different electrical characteristics than the source material employed from which the resultant second atomic array is composed so that multiple layers of restructured source materials are produced.

15. In an apparatus for depositing a restructured coherent atomic layer of source material on the surface of a substrate located within a vacuum chamber, the combination comprising:
means producing a vapor cloud from the source material;
means including an ionizer for ionizing the atoms contained in the vapor cloud situated in an environment of an ultra high vacuum to form an ion cloud;
means for establishing an electrostatic potential gradient between said ionizing means and the substrate to accelerate and control the direction of travel of the ionized atoms;
means for supplying a quantity of electrons to said substrate; and
electromagnetic means coaxially disposed with respect to said ionizing means and said electrostatic means for generating a magnetic field in the area of the substrate having magnetic flux lines extending normal to the surface of the substrate for controlling the direction of ionized atom deposit in a preferred orderly orientation on the substrate surface at right angles to the magnetic flux lines to form a restructured coherent atomic array of the source material on the substrate surface.

16. The invention as defined in claim 15 wherein said means for producing the vapor cloud includes:
a toroidal electron source coaxially disposed about the source material and adapted to emit a conical electron beam directed at the center of the source material surface exposed to said toroidal electron source; and
second electromagnetic means including an electromagnet coaxially disposed about said toroidal electron source for focusing the conical electron beam so as to concentrate electron bombardment at the center of the source material surface to create intense local heat effective to melt and vaporize a portion of the source material without interfering with the formation of the ion cloud.

17. The invention as defined in claim 16 wherein said second electromagentic means establishes a toroidal unitary transverse magnetic field in the path of said electron beam providing magnetic lines of force of controllable direction of orientation extending around said electron source for focusing said electron beam upon the surface of the source material.

18. The invention as defined in claim 17 wherein said toroidal unitary transverse magnetic field defines a central passageway encircling the vapor cloud for effecting the shaping and confining of the ion cloud.

19. The invention as defined in claim 16 wherein said means for producing the vapor cloud includes:
an optical heater having a hemispherical wall in which the source material is held whereby radiated heat at the center of the source material surface is reflected back by said hemispherical wall to the central point on the source material surface to augment material heating provided by said toroidal electron source.

20. The invention as defined in claim 19 wherein said optical heater includes a plated chromium liner following the contour of said hemispherical wall and separating said wall from said source material.

21. The invention as defined in claim 20 wherein said optical heater includes means for cooling said chromium liner during heating of a portion of the source material to a temperature below the melting temperature of said chromium liner and below the temperature of the source material melt to thereby maintain the chromium liner of said optical heater in a solidified state and prevent fusing of the source material to said chromium liner.

22. The invention as defined in claim 19 wherein:
said electrostatic means includes a circular charging screen having a circular lower portion of reduced diameter;
said charging screen lower portion located in fixed spaced relationship with respect to said ionizer so that an annular passageway is defined therebetween;
said electrostatic means and said ionizing means also includes voltage source means independently coupled to said charging screen and said ionizer, respectively, operative to establish said electrostatic accelerative and directional control potential gradient whereby said potential gradient is concentrated within said annular passageway between said charging screen and said ionizer from which said potential gradient expands from said ionizer to the substrate.

23. The invention as defined in claim 22 wherein said means for supplying a quantity of electrons to said substrate includes a second toroidal electron source disposed in fixed spaced relationship with respect to the end of said electrostatic means opposite to its end adjacent said ionizer so that the substrate assumes a more negative potential than the ionized atoms.

24. The invevntion as defined in claim 23 wherein:
said first mentioned electromagnetic means is in the form of a toroid defining a central opening in which the substrate is situated;
the surface of the substrate lying substantially in the same horizontal plane as said first electromagnetic means.

25. The invention as defined in claim 24 including means for mounting said first electromagnetic means in atmosphere external of the vacuum chamber.

26. Apparatus for depositing a coherent atomic layer of source material onto the surface of a substrate, comprising:
means for heating the source material in an ultra high vacuum environment to produce a vapor cloud of atomized source material;
means encircling the vapor cloud for ionizing the atomized source material to provide an ion cloud;
electrostatic means arranged in fixed spaced relationship with respect to said ionizing means for generating a potential gradient field effective to transport the ions incorporated in the ion cloud to the substrate;
means coaxial with said electrostatic means including an electromagnet for generating a uniform magnetic field in the area of the substrate having magnetic flux lines extending normal to the surface of the substrate for directing the orderly deposit of the ionized atoms in a preferred array orientation; and
means adjacent the substrate coaxially disposed with respect to said electromagnet for neutralizing the deposited ions while under the continued influence of the magnetic field to form a restructured coherent atomic array of the original source material.

27. The invention as defined in claim 26 wherein:
said heating means includes a toroidal electron source electromagnetically focused at the surface center of the source material; and
an optical heater adapted to reflect radiated heat from the surface center back to the surface center.

28. The invention as defined in claim 27 including the deposit of a second restructured coherent atomic array on the first array.

29. The invention as defined in claim 28 wherein said second array of source material has different electrical conductivity characteristics than the conductivity characteristics of the source material employed for restructuring of said first array.

30. The invention as defined in claim 29 wherein said electromagnet is toroidal and is located in atmosphere about said neutralizing means and lying in the same horizontal plane as the substrate.

31. The invention as defined in claim 27 wherein the source material is composed of silicon.

32. The invention as defined in claim 27 including:
a pair of crucibles for holding source material of two different conductivity types; and
actuating means operably connected to said pair of crucibles for selectively locating either crucible of said pair so that the surface center of the source material held therein will lie substantially along the central vertical axis of the apparatus in coaxial alignment with said heating means.

33. A crucible for holding a source material in which a portion thereof is to be melted and vaporized comprising:
a crucible body formed of a material which is electrically and thermally of good conductivity adapted for operation as an element of an electrical circuit;
said crucible body having a hemispherical recess formed therein;
a chromium liner disposed in said hemispherical recess separating said crucible body from the source material;
means for supporting said crucible body; and
means for recirculating a coolant through said crucible body supporting means during the melting of the source material to a temperature below the melting temperature of said crucible body to provide a thermal interlock between said body and said supporting means and below the temperautre of the source material melt thereby maintaining said chromium liner in a solidified state and to prevent fusing of the melt to said chromium liner.

34. The invention as defined in claim 33 wherein said chromium liner is operable as an optical heater whereby heat from the source material melt at the surface center thereof is reflected back to the surface center to augment heating of the source material whereby the source material melt at the surface center is held by relatively solid source material disposed between the source material melt and said chromium liner.

35. The invention as defined in claim 34 wherein the source material is composed of silicon.

36. The combination of an electron source heater and a crucible for controllably heating the surface of a source material disposed in said crucible comprising:
  an annular wire filament coaxially disposed in fixed spaced relationship with respect to the source material and having a diameter greater than the diameter of the source material; and
  voltage source means electrically connected to said wire filament operable to effect the continuous emission of a conically shaped electron beam converging at the center of the source material so that electron bombardment will create an intense localized heating point at the surface center of the source material to create a vapor cloud.

37. The invention as defined in claim 36 further including in combination therewith electromagnetic focusing and ionizing means for establishing a magnetic field operable to provide magnetic lines of force for focusing the electron beam upon the surface of the source material and for ionizing the vapor cloud.

38. An electron gun comprising:
  a toroidal electron emission including a wire element;
  voltage supply means electrically connected to said element operable to effect the continuous emission of a substantially conical configured electron beam converging at an apex;
  a two-stage electrostatic accelerator means for controlling the direction and configuration of electron emission; and
  electromagnetic means coaxial with said emission element to focus said conical electron beam.

39. A method for restructuring a molten source material from an ionized vapor state to a solid state in the form of a substantially coherent, dense, and impacted atomic layer of the source material on the surface of a substrate comprising the steps of:
  generating a magnetic field having magnetic lines of flux extending about the substrate surface and the molten source material;
  generating ions of the molten source material to be deposited on the substrate surface; and
  forming the coherent atomic layer of source material in solid state while under the continued influence of the magnetic field adapted to control the direction of the ionized source material deposit.

40. The method as defined in claim 39 wherein said forming step includes the step of:
  neutralizing the ions prior to, during and immediately after deposition so that the ions are returned to their original atomic valence state resulting in a restructed coherent atomic array of the dense and impacted source material.

41. The method as defined in claim 39 wherein said step of generating a magnetic field includes subjecting the surface of the substrate to a substantially greater level of magnetic flux than the level of magnetic flux generated at the molten source material.

42. Apparatus for restructuring a molten source material from an ionized vapor state to a solid state in the form of a substantially coherent atomic layer of the source material on the surface of a substrate comprising:
  a heater for maintaining the source material in a molten state to produce a vapor cloud of atomized source material;
  an ionizer adjacent the vapor cloud for ionizing the atomized source material to provide an ion cloud;
  electrostatic transport means arranged in fixed spaced relationship to said ionizer for moving the ions in the ion cloud to the substrate;
  an electromagnet operably arranged with respect to said electrostatic means for generating a magnetic field in the area of the substrate and said ionizer for effecting the orderly deposit of the ionized atoms in a preferred array orientation; and
  means adjacent the substrate for neutralizing the deposited ions to form the layer in a solid state of the original source material.

43. The invention as defined in claim 42 wherein said neutralizing means is disposed between the substrate and said ionizer.

44. The invention as defined in claim 42 wherein said electromagnet generates a substantially greater magnetic field in the area of the substrate than is generated in the area of said ionizer.

References Cited

UNITED STATES PATENTS

| | | | |
|---|---|---|---|
| 2,519,616 | 8/1950 | Watkins | 263—40 |
| 2,994,801 | 8/1961 | Hanks. | |
| 3,051,555 | 8/1962 | Rummel | 23—223.5 |
| 3,327,090 | 6/1967 | Greene. | |

FOREIGN PATENTS

| | | |
|---|---|---|
| 1,359,811 | 3/1964 | France. |

ROBERT K. SCHAEFER, *Primary Examiner.*

M. GINSBURG, *Assistant Examiner.*

U.S. Cl. X.R.

118—49.5; 219—121; 263—48